United States Patent
Suzuki et al.

(10) Patent No.: US 9,679,385 B2
(45) Date of Patent: Jun. 13, 2017

(54) THREE-DIMENSIONAL MEASUREMENT APPARATUS AND ROBOT SYSTEM

(71) Applicant: CANON KABUSHIKI KAISHA, Tokyo (JP)

(72) Inventors: Hideaki Suzuki, Kawasaki (JP); Tadashi Hayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 260 days.

(21) Appl. No.: 13/928,623

(22) Filed: Jun. 27, 2013

(65) Prior Publication Data

US 2014/0009583 A1 Jan. 9, 2014

(30) Foreign Application Priority Data

Jul. 3, 2012 (JP) ................................. 2012-149595

(51) Int. Cl.
*G06T 7/00* (2017.01)
*G01B 11/00* (2006.01)

(52) U.S. Cl.
CPC .......... *G06T 7/0065* (2013.01); *G01B 11/002* (2013.01); *G06T 7/0075* (2013.01); *G06T 2207/10012* (2013.01); *G06T 2207/30164* (2013.01); *Y10S 901/46* (2013.01)

(58) Field of Classification Search
CPC .............................. G06T 7/0065; Y10S 901/46
See application file for complete search history.

(56) References Cited

U.S. PATENT DOCUMENTS

| | | | |
|---|---|---|---|
| 5,995,649 A | * | 11/1999 | Marugame ........... G06K 9/6202 345/419 |
| 7,630,539 B2 | | 12/2009 | Ikeda et al. |
| 2006/0193509 A1 | | 8/2006 | Criminisi et al. |
| 2007/0265088 A1 | * | 11/2007 | Nakada et al. ................. 463/37 |
| 2010/0232684 A1 | * | 9/2010 | Fujieda ................... G06T 7/002 382/154 |
| 2011/0001797 A1 | * | 1/2011 | Cookson ............ H04N 13/0296 348/47 |
| 2011/0122228 A1 | | 5/2011 | Fujieda et al. |
| 2012/0026295 A1 | | 2/2012 | Nishimura et al. |
| 2013/0027546 A1 | | 1/2013 | Hayashi |
| 2013/0100255 A1 | * | 4/2013 | Ohba .................... G06T 3/4038 348/47 |

FOREIGN PATENT DOCUMENTS

| | | |
|---|---|---|
| JP | 2004-104561 A | 4/2004 |
| JP | 2005-045328 A | 2/2005 |
| JP | 2005045328 A * | 2/2005 |
| JP | 2008-232976 A | 10/2008 |
| JP | 2011-191312 A | 9/2011 |
| JP | 2012-028949 A | 2/2012 |

OTHER PUBLICATIONS

Extended European Search Report in European Application No. 13174627.3 received Dec. 5, 2013.

* cited by examiner

*Primary Examiner* — Jamie Atala
*Assistant Examiner* — Hesham Abouzahra
(74) *Attorney, Agent, or Firm* — Fitzpatrick, Cella, Harper & Scinto (57) ABSTRACT

There are provided a three-dimensional measurement apparatus capable of speeding up image processing, and a robot system including the same.

5 Claims, 7 Drawing Sheets

IMAGE SENSOR OF BASE CAMERA

IMAGE SENSOR OF REFERENCE CAMERA

THREE-DIMENSIONAL MEASUREMENT APPARATUS AND ROBOT SYSTEM

BACKGROUND OF THE INVENTION

Field of the Invention

The present invention relates to a three-dimensional measurement apparatus for capturing images of a workpiece from two or more view points to make a three-dimensional measurement or view the workpiece stereoscopically, and a robot system including the same.

Description of the Related Art

Conventionally, a three-dimensional measurement apparatus has been widely used, which captures images with a plurality of cameras in making a three-dimensional measurement or stereoscopic viewing to acquire three-dimensional information in order to make a three-dimensional measurement from the three-dimensional information. As the three-dimensional measurement apparatus, for example, a stereo method is widely known, which extracts feature points from captured two images, respectively, and establishes correspondences among the extracted feature points to make a three-dimensional measurement by the principle of triangulation.

In the meantime, in the field of digital cameras using an image sensor such as CCD or CMOS, digital cameras having a partial cropping function for presetting a range of pixels to be read on the image sensor to read only necessary pixels have become common in recent years. The partial cropping function can reduce the data volume to be handled, and hence has the advantage of being able to perform transfer of image data and image processing at a higher speed than the case of using all pixels.

However, the above-mentioned partial cropping function is required to preset the range of reading pixels on the image sensor. Therefore, for example, when objects are conveyed along a production line in such a state that the objects vary in position, there arises a problem of making it difficult to adapt the partial cropping function to the state.

On the other hand, as a method of cropping an area from a stereo image, there is proposed a three-dimensional measurement apparatus which, after acquiring a first image and a second image, finds a portion similar to the first image from the second image to set a cropping range from the similar portion (see Japanese Patent Application Laid-Open No. 2005-045328).

However, since the three-dimensional measurement apparatus described in Japanese Patent Application Laid-Open No. 2005-045328 sets the portion similar to the first image as the cropping range of the second image after acquiring both of the first image and the second image from a camera, there is a problem that the time of transferring images from the camera cannot be reduced. In other words, the benefits of the partial cropping function in the above-mentioned digital camera cannot be derived.

Therefore, it is an object of the present invention to provide a three-dimensional measurement apparatus for reducing the amount of information to enable speeding up of image processing, and a robot system including the same.

SUMMARY OF THE INVENTION

The present invention provides a three-dimensional measurement apparatus including: a first camera for capturing an image of a workpiece; a second camera for capturing an image of the workpiece from a view point different from the first camera; and a control unit for calculating three-dimensional coordinates from a first image acquired by capturing the workpiece with the first camera and preset virtual workpiece depth information, calculating a projection of a three-dimensional image of the workpiece to the second camera from the calculated three-dimensional coordinates and a posture parameter of the second camera relative to the first camera, setting a cropping range of the second camera based on the calculated projection, and measuring a three-dimensional position of the workpiece from the first image captured with the first camera and a second image cropped in the cropping range of the second camera.

The present invention also provides a three-dimensional measurement method including: a first image acquiring step for capturing a workpiece with a first camera to acquire a first image; a three-dimensional coordinate calculating step for calculating three-dimensional coordinates from the first image acquired in the first image acquiring step and virtual workpiece depth information; a projection calculating step for calculating a projection of the three-dimensional coordinates to a second camera from a posture parameter of the second camera relative to the first camera and the three-dimensional coordinates; a cropping range setting step for setting a cropping range of a second image to be cropped from the second camera based on the projection calculated in the projection calculating step; a second image acquiring step for acquiring the second image in the cropping range set in the cropping range setting step; and a three-dimensional measurement step for making a three-dimensional measurement of the workpiece from the first image and the second image.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

First Embodiment

Figure 1:
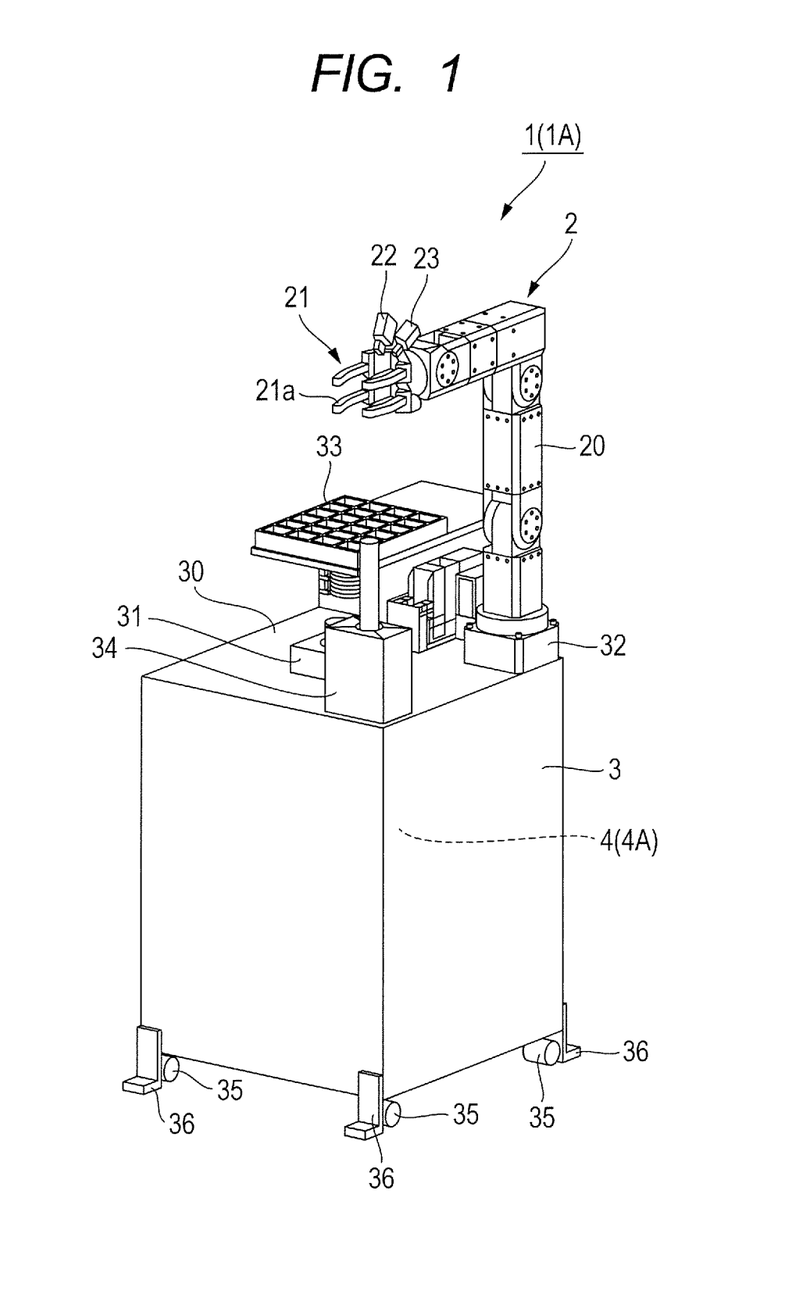
FIG. 1 is a perspective view illustrating a schematic structure of a robot system according to an exemplary embodiment of the present invention.
Figure 2:
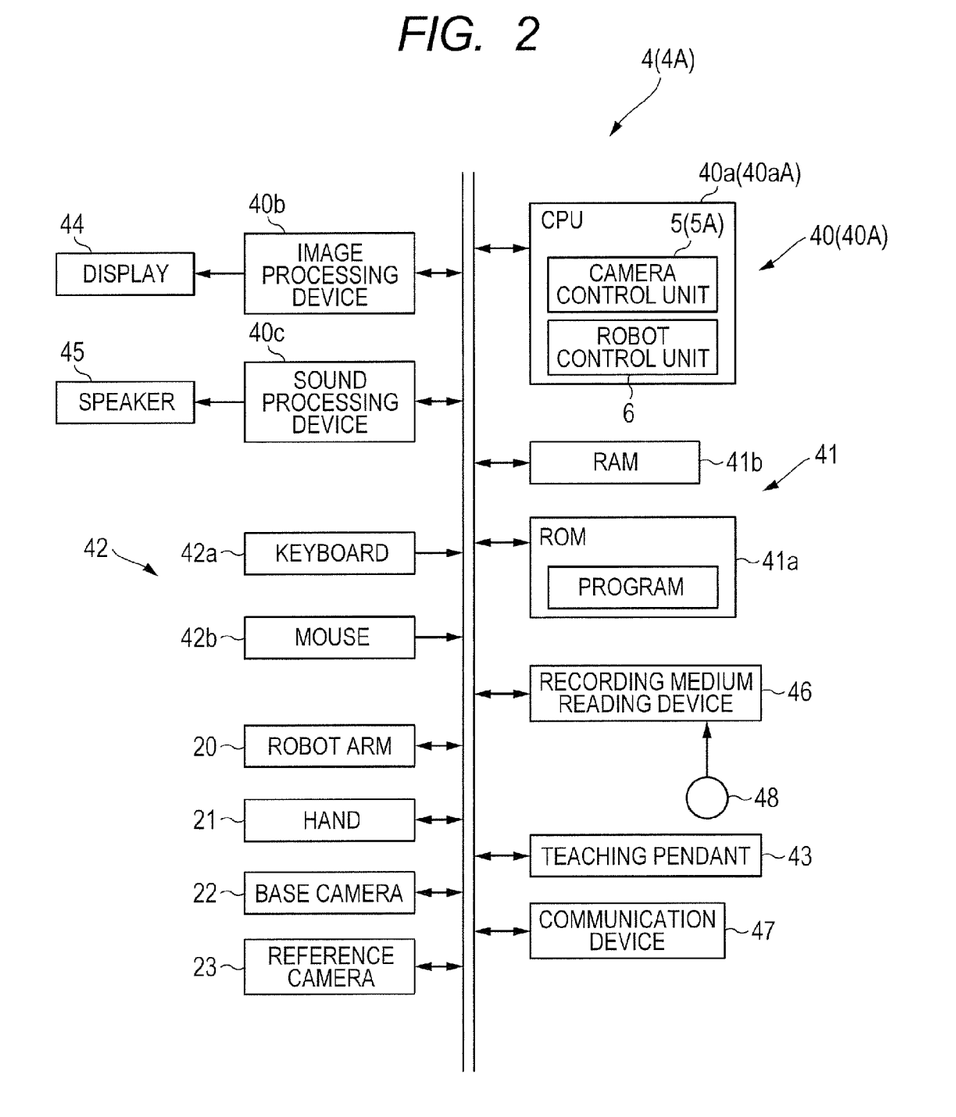
FIG. 2 is a block diagram illustrating the configuration of a control device in the robot system according to the exemplary embodiment.
Figure 3:
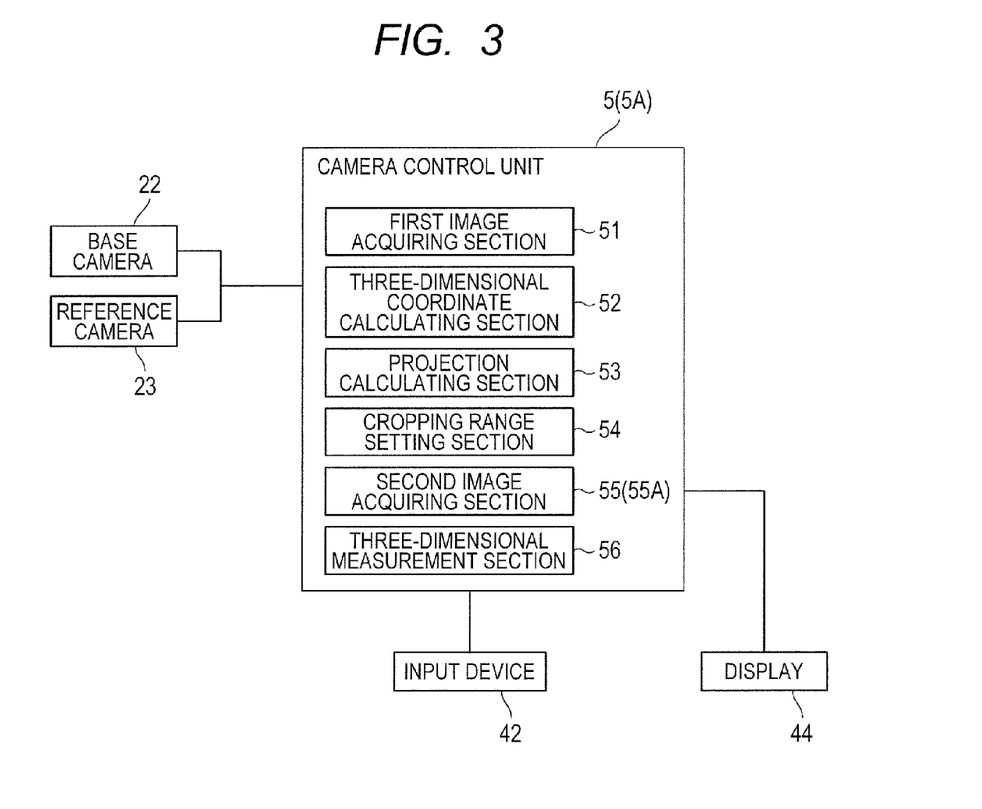
FIG. 3 is a block diagram illustrating the configuration of a camera control unit according to the exemplary embodiment.

A robot system 1 according to a first embodiment of the present invention will be described below with reference to FIG. 1 to FIG. 6. First, a schematic structure of the robot system 1 will be described with reference to FIG. 1 to FIG. 3. FIG. 1 is a perspective view illustrating the robot system 1 according to an exemplary embodiment of the present invention. FIG. 2 is a block diagram illustrating the configuration of a control device 4 in the robot system 1 according to the exemplary embodiment. FIG. 3 is a block diagram illustrating the configuration of a camera control unit 5 according to the exemplary embodiment.

As illustrated in FIG. 1, the robot system 1 according to the first embodiment includes a robot 2 for assembling a workpiece, a mounting base 3 on which the robot 2 assembles the workpiece, and the control device 4 for controlling the robot 2.

The robot 2 is a six-shaft multi-joint general-purpose robot including a robot arm 20, a hand 21 attached to the tip of the robot arm, a base camera 22 as a first camera, and a reference camera 23 as a second camera. In the embodiment, two cameras, i.e. the base camera 22 and the reference camera 23 are used, but a stereo camera unit which can obtain images at two viewpoints may be used.

The robot arm 20 is equipped with six actuators (not illustrated) for driving each joint to rotate about each joint axis. The six actuators are selectively driven, respectively, to move the hand 21 attached to the tip to any three-dimensional position. The hand 21 is equipped with a gripping portion 21a for gripping the workpiece and an actuator, not illustrated, for driving the gripping portion 21a. The gripping portion 21a is moved by the driving of the robot arm 20 to a position in which the actuator is so driven that the gripping portion 21a will grip the workpiece. A force sensor, not illustrated, is provided in the hand 21 to regulate a grip force when the workpiece is gripped. The hand 21 is detachably attached to the tip of the robot arm 20 in a manner to be changeable according to the shape of the workpiece to work on.

The base camera 22 is attached to the tip of the robot arm 20 to capture an image of the workpiece in order to acquire a first image of the workpiece. The reference camera 23 is attached adjacent to the base camera 22 at the tip of the robot arm 20 to capture an image of the workpiece from a view point different from the base camera 22 in order to acquire a second image of the workpiece.

The mounting base 3 is formed into a rectangular box shape, and provided with a planar placement section 30 with the workpiece placed on the top face thereof. A jig 31 used to assemble the workpiece is provided substantially in a central portion of the placement section 30. A support 32 for immovably supporting the base end section of the robot arm 20, a part feeder 33, and a tool holder 34 are provided at the corners of the placement section 30, respectively. Four casters 35 . . . for moving the mounting base 3 and four fixing brackets 36 . . . for fixing the mounting base 3 to the floor are provided at the bottom of the mounting base 3 so that the mounting base 3 can be fixed after the mounting base 3 is moved to any position.

As illustrated in FIG. 2, the control device 4 is so configured that the robot arm 20, the hand 21, the base camera 22, and the reference camera 23 are connected through a bus to a computer main body having a calculating device 40 and a storing device 41. An input device 42, a teaching pendant 43, a display 44, a speaker 45, a recording medium reading device 46, a communication device 47, and the like are also connected to the computer main body through the bus. In FIG. 2, interfaces for these connections are not illustrated.

The calculating device 40 includes a CPU 40a, an image processing device 40b, and a sound processing device 40c. The CPU 40a includes a camera control unit 5 and a robot control unit 6. The camera control unit 5 measures a three-dimensional position of a workpiece according to various programs stored in the storing device 41 and the settings input from the input device 42.

As illustrated in FIG. 3, the camera control unit 5 includes a first image acquiring section 51, a three-dimensional coordinate calculating section 52, a projection calculating section 53, a cropping range setting section 54, a second image acquiring section 55, and a three-dimensional measurement section 56. The first image acquiring section 51 captures a workpiece with the base camera 22 to acquire a first image of the workpiece. The three-dimensional coordinate calculating section 52 calculates three-dimensional coordinates from the first image acquired in the first image acquiring section 51 and preset virtual workpiece depth information. The virtual workpiece depth information may be set, for example, with reference to a focal distance at the time of capturing the workpiece with the base camera 22.

The projection calculating section 53 calculates the projection of a three-dimensional image of the workpiece onto the image sensor of the reference camera 23 from the camera parameters of the reference camera 23 and the base camera 22, and the three-dimensional coordinates calculated in the three-dimensional coordinate calculating section 52. Based on the projection calculated in the projection calculating section 53, the cropping range setting section 54 sets a cropping range of pixels on the image sensor of the reference camera 23. The second image acquiring section 55 captures an image of the workpiece in the cropping range on the image sensor of the reference camera 23 set in the cropping range setting section 54 to acquire a second image. The three-dimensional measurement section 56 measures a three-dimensional position of the workpiece from the first image and the second image. The measurement of the three-dimensional position of the workpiece by the camera control unit 5 will be described in detail later.

Based on the three-dimensional position of the workpiece measured by the camera control unit 5, the various programs stored in the storing device 41, and the settings input from the input device 42, the robot control unit 6 controls the robot arm 20 and the hand 21. The description of the control of the robot arm 20 and the hand 21 performed by the robot control unit 6 will be omitted.

The image processing device 40b controls the display 44 in accordance with a drawing instruction from the CPU 40a to cause the display 44 to display a predetermined image on the screen. The sound processing device 40c generates a sound signal in accordance with a sound generation instruction from the CPU 40a to output the sound signal to the speaker 45.

The storing device 41 is connected to the CPU 40a through the bus, and includes a ROM 41a in which the various programs and data are stored, and a RAM 41b reserved as a working area of the CPU 40a. In the embodiment, the various programs for measuring the workpiece three-dimensionally are stored in the ROM 41a in addition to drive programs for the robot arm 20 and the hand 21. For example, a three-dimensional measurement program for executing a first image acquiring step, a three-dimensional coordinate calculating step, a projection calculating step, a cropping range setting step, a second image acquiring step, and a three-dimensional measurement step to be described later is stored. When a worker enters virtual workpiece depth information and data, such as camera parameters of the base camera 22 and the reference camera 23, from the input device 42, these are also stored in the ROM 41a.

The input device 42 is composed of a keyboard 42a and a mouse 42b to enable input of information necessary to measure the three-dimensional position of the workpiece and other instructions. The recording medium reading device 46 is used to read a computer-readable recording medium 48 that has recorded, for example, the three-dimensional measurement program, and to store the three-dimensional measurement program in the ROM 41a. The communication device 47 is used to download the three-dimensional measurement program distributed from the Internet through the communication device 47 without using the recording medium 48 mentioned above.

Figure 4:
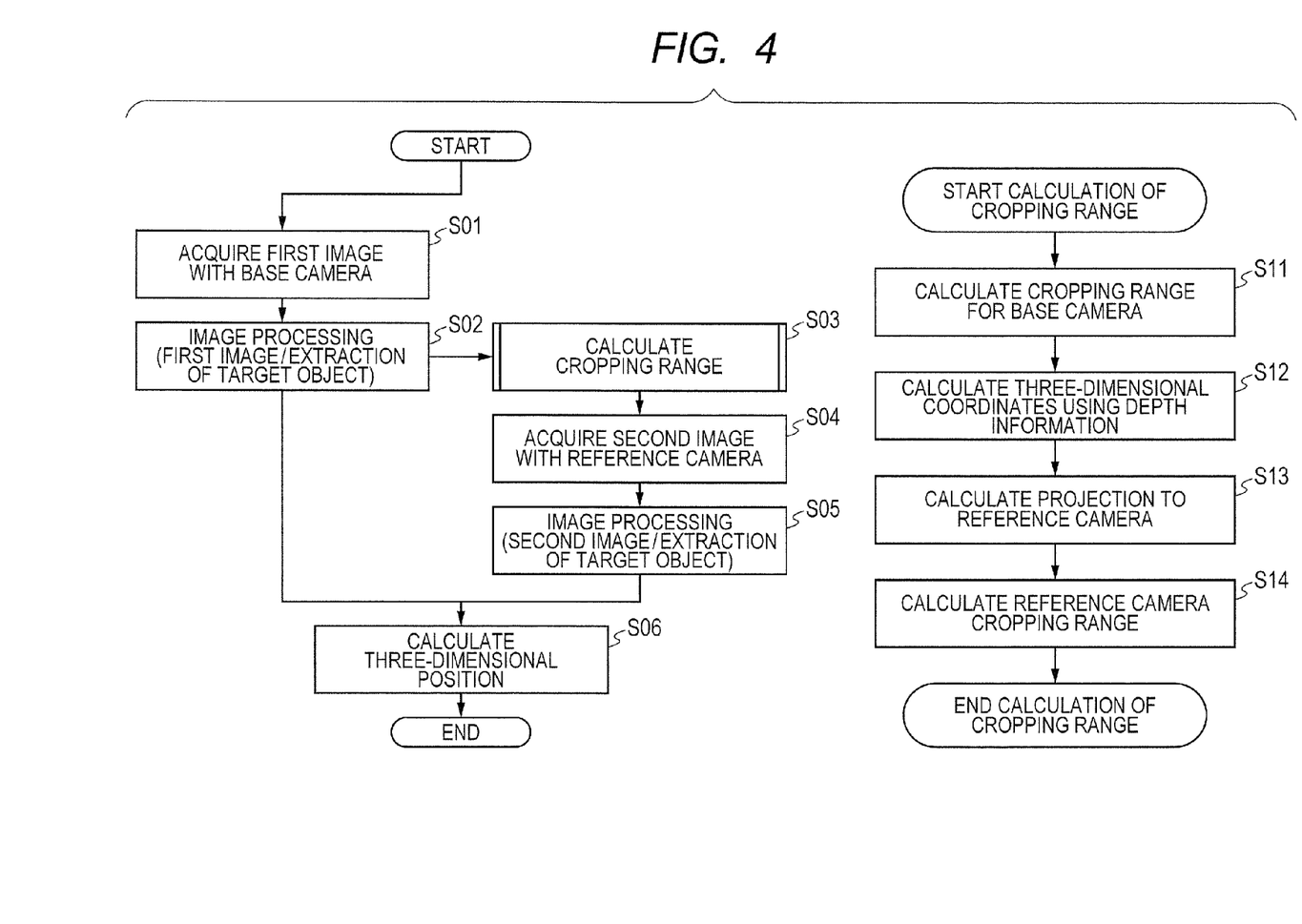
FIG. 4 is a flowchart of a three-dimensional measurement made by the camera control unit according to a first embodiment.
Figure 5:
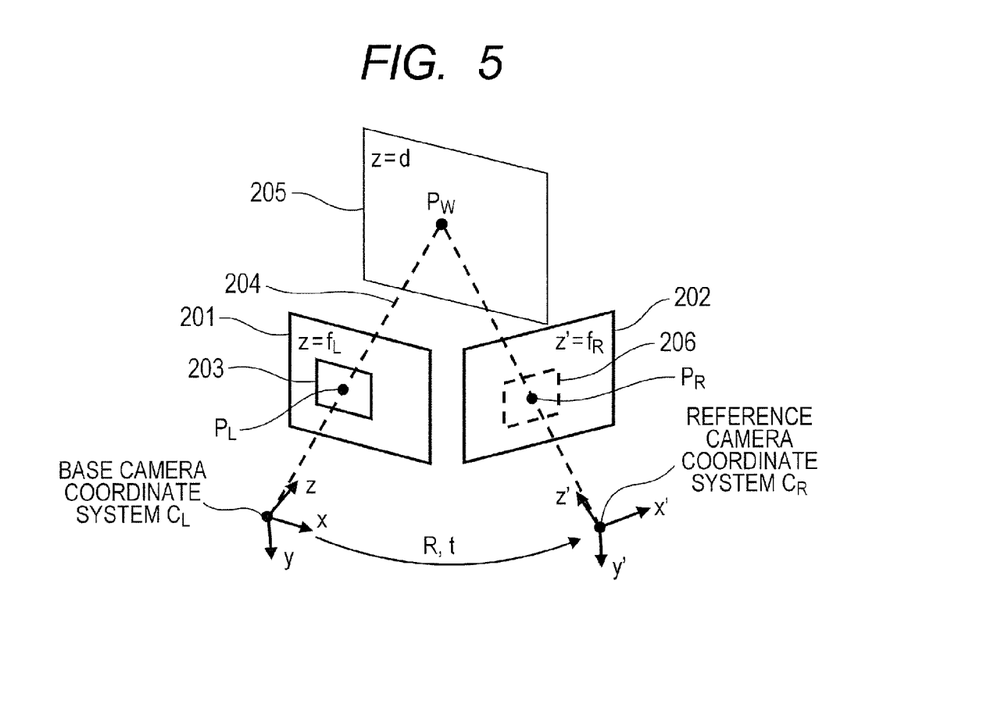
FIG. 5 is a diagram illustrating the positional relationship between a cropping range in each of images, acquired with a base camera and a reference camera, and a projected point according to the first embodiment.
Figure 6:
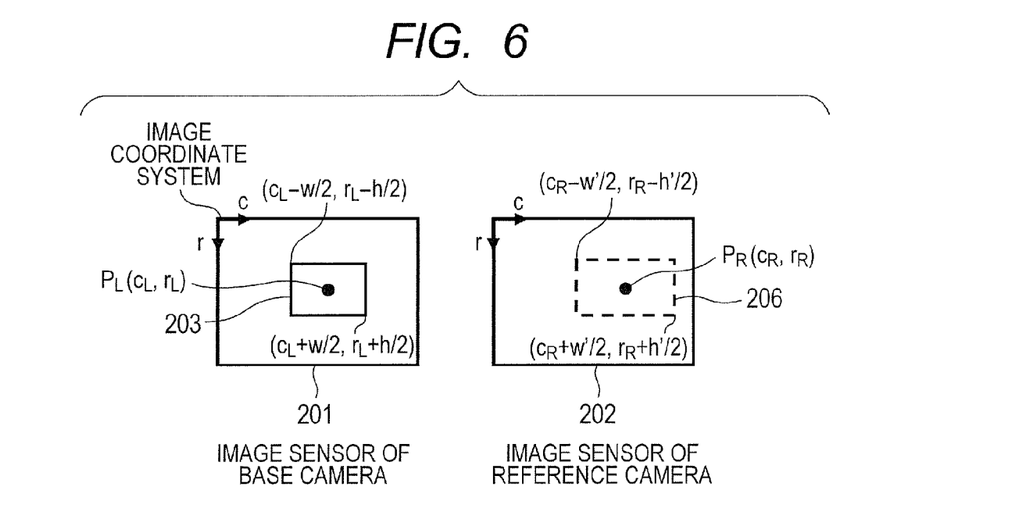
FIG. 6 is a diagram illustrating image sensors of the base camera and the reference camera according to the first embodiment.

Next, a method of measuring the three-dimensional position of the workpiece by the camera control unit 5 when the hand 21 in the robot system 1 structured as mentioned above grips the workpiece will be described along a flowchart illustrated in FIG. 4 while referring to FIG. 5 and FIG. 6. FIG. 4 is a flowchart of a three-dimensional measurement by the camera control unit 5 according to the first embodiment. FIG. 5 is a diagram illustrating the positional relationship between a cropping range in each of images, acquired with the base camera 22 and the reference camera 23, and a projected point according to the first embodiment. FIG. 6 is a diagram illustrating image sensors of the base camera 22 and the reference camera 23 according to the first embodiment.

First, internal parameters of the base camera 22, internal parameters of the reference camera 23, and posture parameters of the cameras are predetermined and stored in the ROM 41a. The internal parameters are parameters required to calculate a projection from the coordinates of any three-dimensional point to a point on an image, which can be determined by a known camera calibration technique. In the embodiment, the following is used as the internal parameters.

If f denotes the focal length of a lens, $c_x$ denotes the X coordinate of the center of the optical axis of a camera in an image, $c_y$ denotes the Y coordinate of the center of the optical axis of the camera in the image, $s_x$ denotes the width of an image sensor per pixel, and $s_y$ denotes the height of the image sensor per pixel, the internal parameters of the base camera 22 can be expressed as ($f_L$, $c_{xL}$, $c_{yL}$, $s_{xL}$, $s_{yL}$). On the other hand, the internal parameters of the reference camera 23 can be expressed as ($f_R$, $c_{xR}$, $c_{yR}$, $s_{xR}$, $s_{yR}$). Note that the subscript L indicates the base camera 22 drawn on the left hand of the drawings, and the subscript R indicates the reference camera 23 drawn on the right side of the drawings.

The posture parameters represent relative postures of the base camera 22 and the reference camera 23, which can be determined by the known camera calibration technique. In the embodiment, the posture parameters of the base camera 22 and the reference camera 23 are represented by a rotation matrix R and a translation vector t.

Here, in FIG. 5, a base camera coordinate system $C_L$ and a reference camera coordinate system $C_R$ are coordinate systems, which are representative of the postures of the respective cameras and arranged to agree with the coordinate systems of images in X and Y directions with their origins at the lens principal point of each camera. The above-mentioned posture parameters represent the relative postures of the base camera coordinate system $C_L$ and the reference camera coordinate system $C_R$. Reference numerals 201 and 202 illustrated in FIG. 5 and FIG. 6 represent image sensor planes of the base camera 22 and the reference camera 23, respectively, to acquire images as a result of projecting any object (e.g. workpiece) onto the image sensor planes 201 and 202. Note that the lens principal point is reversed to the actual physical layout of the image sensors in FIG. 5 for simplifying the description.

Next, as illustrated in FIG. 4, the robot system 1 is moved to the position of an image capturing posture to acquire the first image with the base camera 22 (step S01: first image acquiring step). Then, image processing is performed on the first image to detect the workpiece in the image (step S02). For this detection, any of known various image processing techniques, such as pattern matching or binarization can be used. After that, based on the detection result of the first image of the workpiece in step S02, a reference camera cropping range 206 to be set in the reference camera 23 is calculated (step S03). The following will describe the cropping step S03 by dividing the step into sub-steps S11 to S14. First, a base camera cropping range 203 is calculated based on the result of extracting the target object in the first image (step S11). As the base camera cropping range 203, for example, the smallest rectangular area surrounding an image area of the target object extracted in the first image is calculated.

Next, a cropping reference point $P_L$ is set for the calculated base camera cropping range 203. Although it is preferred that the cropping reference point $P_L$ be substantially the center of the base camera cropping range 203, any point may be used as long as the point is uniquely determined for the base camera cropping range 203. In the embodiment, if the center of gravity of the base camera cropping range 203 is used as the cropping reference point $P_L$ and the image coordinates are denoted by $P_L$ ($c_L$, $r_L$), $P_L$ is expressed as follows.

$$^{(CL)}P_L = \begin{pmatrix} x_L \\ y_L \\ z_L \end{pmatrix} = \begin{pmatrix} s_{xL}(c_L - c_{xL}) \\ s_{yL}(r_L - c_{yL}) \\ f_L \end{pmatrix}$$

Here, $s_{xL}$ and $s_{yL}$ denote the image sensor size as internal parameters of the base camera 22, and $c_{xL}$ and $c_{yL}$ denote the position of the center of the optical axis on the image coordinates. Further, $f_L$ denotes the focal distance of the base camera 22. In the embodiment, no lens distortion is taken into account for simplicity's sake, but a conversion equation that takes the known lens distortion into account may be used.

Next, a three-dimensional point $P_W$ of the workpiece is calculated by using the cropping reference point $P_L$ and virtual workpiece depth information (step S12: three-dimensional coordinate calculating step). Here, the depth information is information for defining the distance from the lens of the base camera 22 to an area to be measured, which is preset by a user and prestored in the ROM 41a. A workpiece distance at which the lens comes into focus may be set as the depth information. If a rough distance between the workpiece and the camera can be predefined, the distance may be determined from a design value. For example, for production equipment, it is often the case that the layout rules between the workpiece and the camera are predetermined according to the production process to be carried out. Therefore, the virtual workpiece depth information can be easily set. In the embodiment, the distance d of the base camera coordinate system $C_L$ is defined, and z=d is set as the depth information and stored in the ROM 41a.

As illustrated in FIG. 5, the three-dimensional point $P_W$ of the workpiece is an intersection point of a line of sight 204, which connects the origin of the base camera coordinate system $C_L$ and the cropping reference point $P_L$, with a plane 205 defined by the depth information z=d. Since the line of sight 204 is a straight line passing through the base camera coordinate system $C_L$ and the cropping reference point $P_L$, the line of sight 204 is expressed as follows.

$$P = \lambda \cdot {}^{(CL)}P_{Li} = \lambda \cdot \begin{pmatrix} x_L \\ y_L \\ z_L \end{pmatrix}$$

Further, if the coordinates of the three-dimensional point $P_W$ is denoted by $P_W=(x_W, y_W, z_W)$, the three-dimensional point $P_W$ can be determined in the base camera coordinate system $C_L$ from $z_W=\lambda \cdot f_L = d$ as follows.

$$^{(CL)}P_W = \begin{pmatrix} x_W \\ y_W \\ z_W \end{pmatrix} = \begin{pmatrix} x_L d/f_L \\ y_L d/f_L \\ d \end{pmatrix}$$

Next, a projected point $P_R$ of the three-dimensional point $P_W$ to the reference camera 23 is calculated (step S13: projection calculating step). First, the three-dimensional point $P_W$ described in the base camera coordinate system $C_L$ is transformed to a reference camera coordinate system $C_R$. Using the rotation matrix R and the translation vector t as the posture parameters, the coordinate transformation is performed as below. If the coordinates of the three-dimensional point $P_W$ expressed in the reference camera coordinate system $C_R$ is denoted by $P_W=(x'_W, y'_W, z'_W)$, the three-dimensional point $P_W$ is expressed as follows.

$$^{(CR)}P_W = \begin{pmatrix} x'_W \\ y'_W \\ z'_W \end{pmatrix} R^{-1} \cdot ({}^{(CL)}P_W - t)$$

Next, a projected point $P_R$ as a result of projecting, to the reference camera 23, the three-dimensional point $P_W$ expressed in the reference camera coordinate system $C_R$ is determined. Using the focal distance $f_R$ of the reference camera 23, $P_R=(x'_R, y'_R, z'_R)$ is expressed as follows.

$$^{(CR)}P_R = \begin{pmatrix} x'_R \\ y'_R \\ z'_R \end{pmatrix} = \begin{pmatrix} x'_W f_R / z'_W \\ y'_W f_R / z'_W \\ f_R \end{pmatrix}$$

Further, using the internal parameters of the reference camera 23, the image coordinates $(c_R, r_R)$ of the projected point $P_R$ are expressed as follows.

$$\begin{pmatrix} c_R \\ r_R \end{pmatrix} = \begin{pmatrix} x'_R / s_{xR} + c_{xR} \\ y'_R / s_{yR} + c_{yR} \end{pmatrix}$$

According to above processing, the image coordinates of the projected point $P_R$ as a result of projecting the three-dimensional point $P_W$ to the reference camera 23 can be calculated.

Next, a reference camera cropping range 206 to be set in the reference camera 23 is determined with reference to the image coordinates of the projected point $P_R$ (step S14: cropping range setting step). For example, as illustrated in FIG. 6, a rectangular area with the projected point $P_R$ as the center of gravity is set as the reference camera cropping range 206. Here, a cropping width w' and a cropping height h' of the reference camera cropping range 206 may be determined with reference to the width w and the height h of the base camera cropping range 203, or set as fixed values in advance.

The cropping range to be set in the reference camera 23 can be automatically calculated based on the cropping range set in the base camera 22 by executing the above processing steps S11 to S14. When the cropping range is set, a second image captured with the reference camera 23 in the cropping range is acquired (step S04: second image acquiring step), and the workpiece is extracted by performing image processing on the second image (step S05). Finally, a three-dimensional position of the workpiece is measured using the first image and the second image (step S06: three-dimensional measurement step). Since the measurement of the three-dimensional position of the workpiece in the three-dimensional measurement step can be made by typical image processing, the description thereof will be omitted here.

As described above, the robot system 1 according to the first embodiment automatically calculates the reference camera cropping range to be set in the reference camera 23 based on the base camera cropping range set in the base camera 22 to measure the three-dimensional position based on the respective cropped images. Thus, the images to be calculated can be reduced, i.e., the amount of information and the amount of transmission can be reduced. This enables high-speed image processing for the three-dimensional measurement, and hence reduction in measurement time. As a result, the takt time (process working time) of the robot system 1 can be reduced.

Second Embodiment

Next, a robot system 1A according to a second embodiment of the present invention will be described with reference to FIG. 7 to FIG. 9 while using FIG. 1 to FIG. 3. In the second embodiment, a method of measuring the three-dimensional position by the camera control unit is different from that in the first embodiment. Therefore, in the second embodiment, an emphasis is placed on a point different from the first embodiment, i.e. on the method of measuring the three-dimensional position by the camera control unit, and the same components as those in the first embodiment are given the same reference numerals to omit the description.

First, a schematic structure of the robot system 1A will be described by using FIG. 1 to FIG. 3. As illustrated in FIG. 1 to FIG. 3, the robot system 1A according to the second embodiment includes the robot 2, the mounting base 3, and a control device 4A for controlling the robot 2. The control device 4A includes a calculating device 40A and the storing device 41. The calculating device 40A includes a CPU 40aA, the image processing device 40b, and the sound processing device 40c. The CPU 40aA includes a camera control unit 5A and the robot control unit 6.

Next, a method of measuring the three-dimensional position of a workpiece by the camera control unit 5A when the hand 21 in the robot system 1A structured as mentioned above grips the workpiece will be described along a flowchart illustrated in FIG. 7 while referring to FIG. 8 and FIG. 9. FIG. 7 is a flowchart of a three-dimensional measurement by the camera control unit 5A according to the second embodiment. FIG. 8 is a diagram illustrating the positional relationship between a cropping range in each of images, acquired with the base camera 22 and the reference camera 23, and a projected three-dimensional image according to the second embodiment. FIG. 9 is a diagram illustrating image sensors of the base camera 22 and the reference camera 23 according to the second embodiment.

The following points are the same as the first embodiment: The internal parameters of the base camera 22 are expressed as $(f_L, c_{xL}, c_{yL}, s_{xL}, s_{yL})$, the internal parameters of the reference camera 23 are expressed as $(f_R, c_{xR}, c_{yR}, s_{xR}, s_{yR})$, and these are prestored in the ROM 41a.

Figure 8:
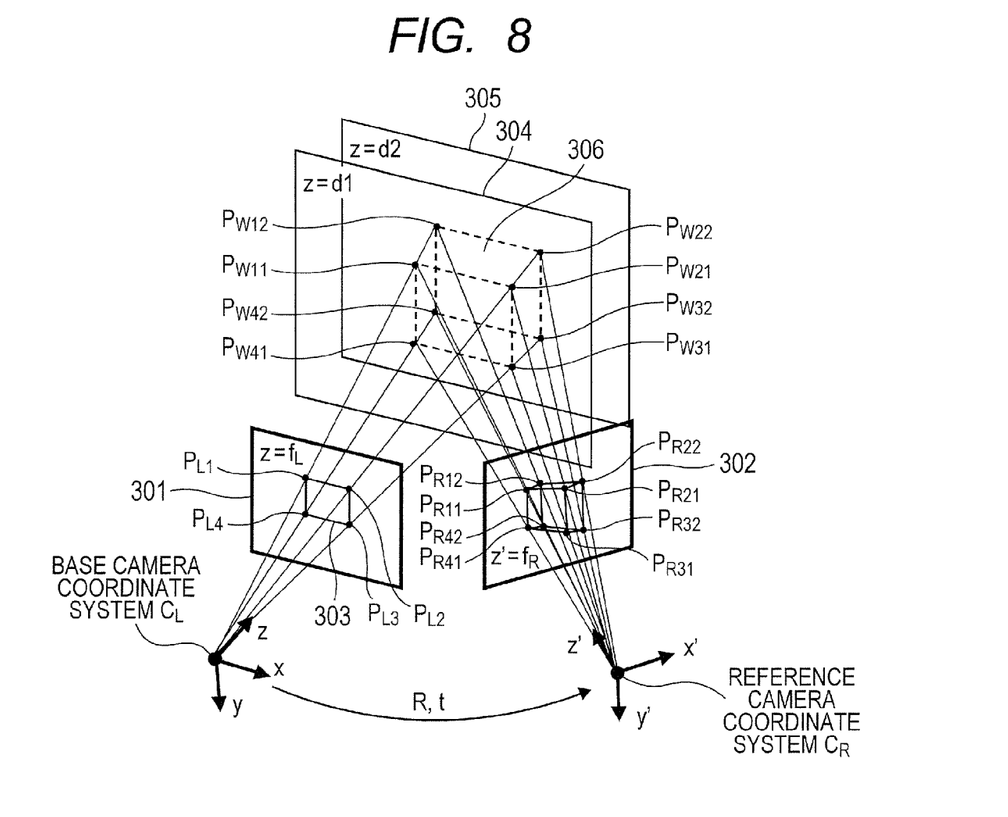
FIG. 8 is a diagram illustrating the positional relationship between a cropping range in each of images, acquired with the base camera and the reference camera, and a projected three-dimensional image according to the second embodiment.
Figure 9:
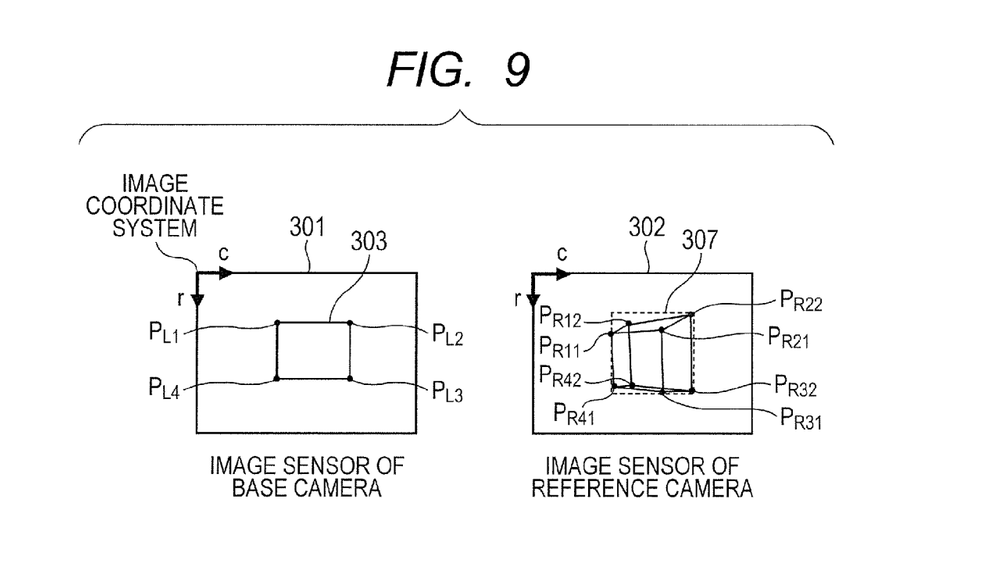
FIG. 9 is a diagram illustrating image sensors of the base camera and the reference camera according to the second embodiment.

In FIG. 8, the base camera coordinate system $C_L$ and the reference camera coordinate system $C_R$ are coordinate systems, which are representative of the postures of the base camera 22 and the reference camera 23, respectively, and arranged to agree with the coordinate systems of images in X and Y directions with their origins at the lens principal point of each camera. The above-mentioned posture parameters represent the relative postures of the base camera coordinate system $C_L$ and the reference camera coordinate system $C_R$. Reference numerals 201 and 202 illustrated in FIG. 8 and FIG. 9 represent image sensor planes of the base camera 22 and the reference camera 23, respectively, to acquire images as a result of projecting any object (e.g. workpiece) onto the image sensor planes 201 and 202. Note that the lens principal point is reversed to the actual physical layout of the image sensors in FIG. 8 for simplifying the description.

Figure 7:
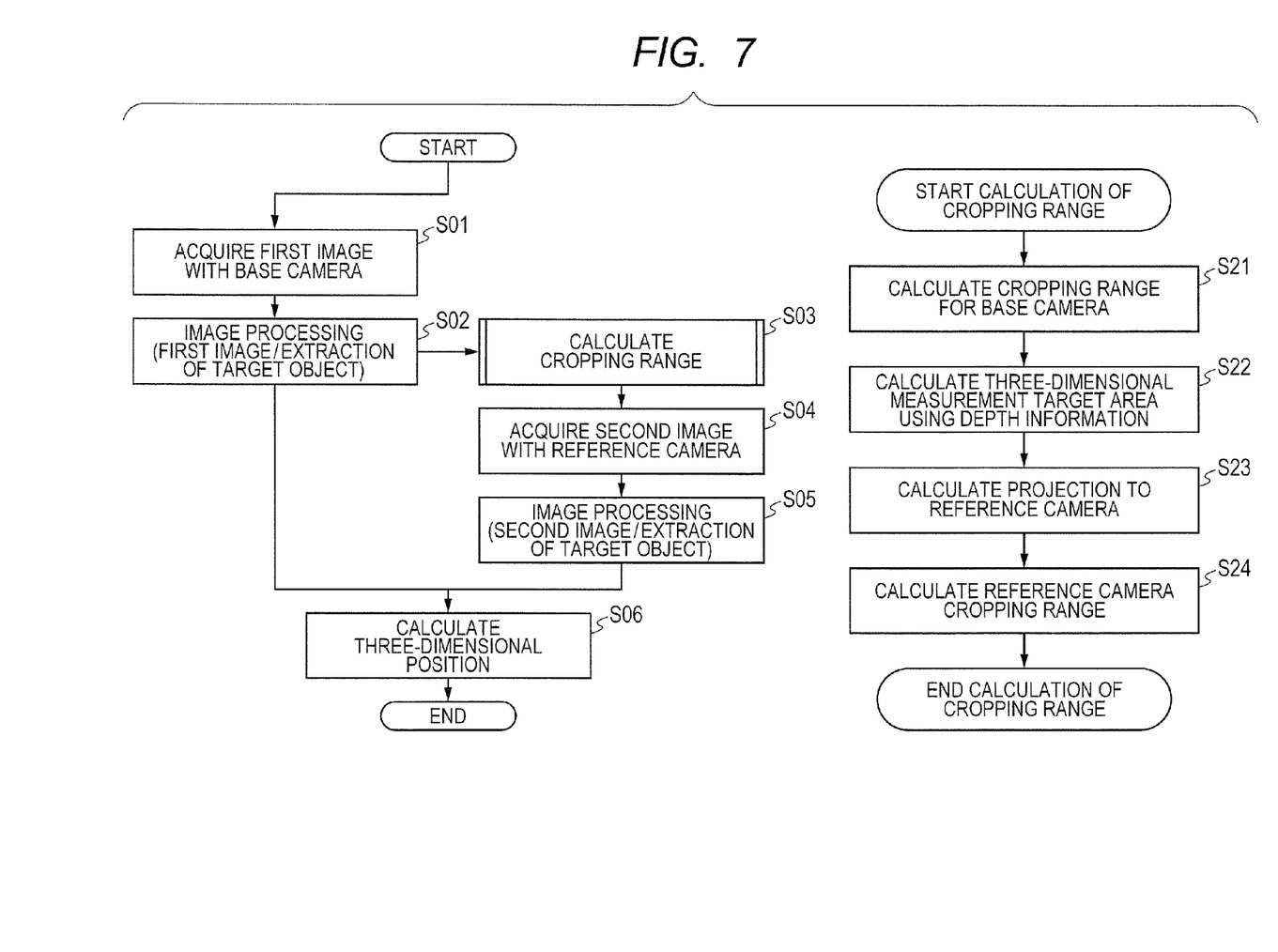
FIG. 7 is a flowchart of a three-dimensional measurement made by a camera control unit according to a second embodiment.

Next, as illustrated in FIG. 7, the robot system 1 is moved to the position of an image capturing posture to acquire a first image with the base camera 22 (step S01: first image capturing step). Then, image processing is performed on the first image to detect the workpiece in the image (step S02). For this detection, any of known various image processing techniques, such as pattern matching or binarization can be used. After that, based on the detection result of the first image of the workpiece in step S02, a reference camera cropping range 307 to be set in the reference camera 23 is calculated (step S03). The following will describe the cropping step S03 by dividing the step into sub-steps S21 to S24. First, a base camera cropping range 303 is calculated based on the result of extracting the target object in the first image (step S21). As the base camera cropping range 303, for example, the smallest rectangular area surrounding an image area of the target object extracted in the first image is calculated.

Next, the coordinates of vertices $P_{Li}$ (i=1, 2, 3, 4) are extracted with respect to the calculated base camera cropping range 303 to set the image coordinates to $P_{Li}$ ($c_{Li}$, $r_{Li}$). Next, a three-dimensional measurement target area (three-dimensional coordinates) where the workpiece can exist is determined using the vertices $P_{Li}$ of the base camera cropping range 303 set in the base camera 22 and virtual workpiece depth information (step S22: three-dimensional coordinate calculating step).

Here, the depth information is information for defining the distance from the lens of the base camera 22 to an area to be measured, which is preset by the user and prestored in the ROM 41a. Note that two points on the near side and far side from the origin of the base camera coordinate system $C_L$ may be set as the depth information to set the front end and rear end of the depth of field in a range of focus areas from the base camera 22. If a distance range between the workpiece and the base camera 22 can be predefined, they may be determined from design values. In the embodiment, $z=d_1$ and $z=d_2$ as distances from the origin of the base camera coordinate system $C_L$ are set as the depth information and stored in the ROM 41a.

The three-dimensional measurement target area is an area surrounded by at least two planes obtained by light-of-sight curved surfaces (four view planes in the embodiment), defined by the base camera cropping range 303, and the depth information. As illustrated in FIG. 8, the three-dimensional measurement target area is represented as a trapezoidal square pyramid area. The coordinates of eight vertices (three-dimensional points) $P_{Wij}$ (i=1, 2, 3, 4, and j=1, 2) are determined as representative points of the three-dimensional measurement target area. Each of the three-dimensional points $P_{Wij}$ is an intersection point of the line of sight from the base camera coordinate system $C_L$ to the vertex $P_{Li}$ of the base camera cropping range 303 with each of planes 304 and 305. The three-dimensional point is calculated in step S22 below.

The vertex $P_{Li}$ ($c_{Li}$, $r_{Li}$) set by the image coordinates in step S21 is expressed in the base camera coordinate system $C_L$ as follows.

$$^{(CL)}P_{Li} = \begin{pmatrix} x_{Li} \\ y_{Li} \\ z_{Li} \end{pmatrix} = \begin{pmatrix} s_{xL}(c_{Li} - c_{xL}) \\ s_{yL}(r_{Li} - c_{yL}) \\ f_L \end{pmatrix}, (i = 1, 2, 3, 4)$$

Here, $s_{xL}$ and $s_{yL}$ denote the image sensor size as internal parameters of the base camera 22, and $c_{xL}$ and $c_{yL}$ denote the position of the center of the optical axis on the image coordinates. Further, $f_L$ denotes the focal distance of the base camera 22. In the embodiment, no lens distortion is taken into account for simplicity's sake, but a conversion equation that takes the known lens distortion into account may be used.

The line of sight passing through the base camera coordinate system $C_L$ and the three-dimensional point $P_{Wij}$ is expressed in the following equation.

$$P_i = \lambda \cdot {}^{(CL)}P_{Li} = \lambda \cdot \begin{pmatrix} x_{Li} \\ y_{Li} \\ z_{Li} \end{pmatrix}, (i = 1, 2, 3, 4)$$

Further, the coordinates of the three-dimensional point $P_{Wij}$ calculated as an intersection point of the line of sight with each of the planes having distances $d_1$ and $d_2$.

If $P_{Wij} = (x_{Wij}, y_{Wij}, z_{Wij})^T$, the three-dimensional point $P_{Wij}$ can be calculated in the base camera coordinate system $C_L$ from $z_{Wij} = \lambda \cdot f_L = d_j$ (i=1, 2, 3, 4, and j=1, 2) as follows.

$$^{(CL)}P_{Wij} = \begin{pmatrix} x_{Wij} \\ y_{Wij} \\ z_{Wij} \end{pmatrix} = \begin{pmatrix} x_{Li} d_j / f_L \\ y_{Li} d_j / f_L \\ d_j \end{pmatrix}, (i = 1, 2, 3, 4, j = 1, 2)$$

Next, a projected point $P_{Rij}$ of the three-dimensional point $P_{Wij}$ to the reference camera 23 is calculated (step S23: projection calculating step). First, the coordinates of $P_{Wij}$ in the base camera coordinate system $C_L$ are transformed to the reference camera coordinate system $C_R$. Using the rotation matrix R and the translation vector t as the posture parameters, the coordinate transformation is performed as below. If the coordinates of the three-dimensional point $P_{Wij}$ expressed in the reference camera coordinate system $C_R$ is denoted by $P_{Wij}=(x'_{Wij}, y'_{Wij}, z'_{Wij})^T$, the three-dimensional point $P_{Wij}$ is expressed as follows.

$$^{(CR)}P_{W_{ij}} = \begin{pmatrix} x'_{W_{ij}} \\ y'_{W_{ij}} \\ z'_{W_{ij}} \end{pmatrix} = R^{-1} \cdot \left( ^{(CL)}P_{W_{ij}} - t \right), (i = 1, 2, 3, 4, j = 1, 2)$$

Next, a projected point $P_{Rij}$ as a result of projecting the three-dimensional point $P_{Wij}$ expressed in the reference camera coordinate system $C_R$ to the reference camera 23 is determined. Using the focal distance $f_R$ of the reference camera 23, $P_{Rij}=(x'_{Rij}, y'_{Rij}, z'_{Rij})^T$ is expressed as follows.

$$^{(CR)}P_{R_{ij}} = \begin{pmatrix} x'_{R_{ij}} \\ y'_{R_{ij}} \\ z'_{R_{ij}} \end{pmatrix} = \begin{pmatrix} x'_{W_{ij}} f_R / z'_{W_{ij}} \\ y'_{W_{ij}} f_R / z'_{W_{ij}} \\ f_R \end{pmatrix}, (i = 1, 2, 3, 4, j = 1, 2)$$

Further, using the internal parameters of the reference camera 23, the image coordinates ($c_{Rij}$, $r_{Rij}$) of the projected point $P_{Rij}$ are determined as follows.

$$\begin{pmatrix} c_{Rij} \\ r_{Rij} \end{pmatrix} = \begin{pmatrix} x'_{Rij}/s_{xR} + c_{xR} \\ y'_{Rij}/s_{yR} + c_{yR} \end{pmatrix}, (i = 1, 2, 3, 4, j = 1, 2)$$

According to the above processing, the image coordinates of the projected point $P_{Rij}$ as a result of projecting the three-dimensional point $P_{Wij}$ of the three-dimensional measurement target area 306 to the reference camera 23 can be determined.

Next, a reference camera cropping range is determined to include all the projected points $P_{Rij}$ of the vertices of the three-dimensional measurement target area, and set in the reference camera 23 (step S24: cropping range setting step). For example, as illustrated in FIG. 9, the smallest rectangular area including the projected points $P_{Rij}$ and parallel to the image coordinates is used as the reference camera cropping range.

The reference camera cropping range 307 to be set in the reference camera 23 can be automatically calculated based on the base camera cropping range 303 set in the base camera 22 by executing the above processing steps S21 to S24. When the reference camera cropping range is set, a second image in the reference camera cropping range is next acquired (S04: second image acquiring step), and the workpiece is extracted by performing image processing on the second image (step S05). Finally, a three-dimensional position of the workpiece is measured using the first image and the second image (step S06: three-dimensional measurement step). Since the measurement of the three-dimensional position of the workpiece in the three-dimensional measurement step can be made by typical image processing, the description thereof will be omitted here.

As described above, since the robot system 1A according to the second embodiment can determine the cropping range by calculating the coordinates of a small number of points alone, the cropping range can be determined at a high speed with a lower computational load than the technique for taking pixel-to-pixel correlation between the base camera 22 and the reference camera 23. Further, in the second embodiment, since the reference camera cropping range 307 is determined by taking into account the projection of the three-dimensional measurement target area 306, the object (workpiece) in the three-dimensional measurement target area 306 can be captured with the reference camera 23 in full measure.

While the embodiments of the present invention have been described, the present invention is not limited to the aforementioned embodiments. Further, the advantageous effects of the embodiments of the present invention are merely listed as most preferred effects derived from the present invention, and the effects of the present invention are not limited to those described in the embodiments of the present invention.

For example, in the first embodiment, the base camera cropping range 203 and the reference camera cropping range 206 are cropped in the shape of a rectangle, but the present invention is not limited thereto. The base camera cropping range and the reference camera cropping range may be cropped in any two-dimensional shape other than the rectangle, such as a polygon, a circle, or an ellipse.

Further, in the first embodiment, the plane 205 that defines the depth information is set as the plane perpendicular to the z-axis direction of the base camera coordinate system $C_L$, but the present invention is not limited thereto. For example, any inclination of the plane that defines the depth may be set. In this case, the depth information expressed as z=d can be set as ax+by+cz=d expanded to a typical plane equation.

In the second embodiment, the planes 304 and 305 that define the depth information are set as the planes perpendicular to the z direction of the base camera coordinate system $C_L$, but the present invention is not limited thereto. For example, any inclination of the planes 304 and 305 that define the depth may be set. In this case, the depth information expressed as z=$d_j$ (j=1, 2) can be set as $a_i$x+$b_i$y+$c_i$z=$d_i$ (i=1, 2) expanded to a typical plane equation.

Further, in the embodiments, the description has been made by using two cameras, i.e. the base camera 22 and the reference camera 23, but the present invention is not limited thereto. For example, a multi camera system composed of three or more cameras may be used. Even when the number of reference cameras is two or more, the internal parameters and posture parameters can be determined for each camera to calculate a reference camera cropping range to be set in each reference camera based on the base camera cropping range set in one base camera.

According to the present invention, the projection of a three-dimensional image of a workpiece captured with a first camera is calculated, and an image of the workpiece is captured in a cropping range of a second camera set based on the calculated projection to make a three-dimensional measurement. This enables reduction in the amount of information and hence speeding up of image processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-149595, filed Jul. 3, 2012, which is hereby incorporated by reference herein in its entirety.

What is claimed is:

1. A three-dimensional measurement apparatus comprising:
   a first camera for capturing an image of a workpiece;
   a second camera for capturing an image of the workpiece from a view point different than a viewpoint of the first camera; and
   a control unit for
      calculating three-dimensional coordinates of the workpiece from both (a) a first image acquired by capturing the workpiece with the first camera and (b) preset virtual workpiece depth information,
      calculating a projection image of the three-dimensional coordinates to the second camera from the calculated three-dimensional coordinates of the workpiece and a posture parameter of the second camera relative to the first camera,
      setting a cropping range of the second camera based on the calculated projection image,
      causing the second camera to acquire a second image by capturing the workpiece in the set cropping range, and
      measuring a three-dimensional position of the workpiece from the first image captured with the first camera and the second image cropped in the set cropping range of the second camera.

2. The three-dimensional measurement apparatus according to claim 1, wherein the control unit sets a reference point from the calculated projection image and sets the cropping range to include an area preset from the set reference point.

3. A robot system comprising:
   the three-dimensional measurement apparatus according to claim 1 to make a three-dimensional measurement of the workpiece; and
   a robot arm for gripping the workpiece based on the three-dimensional position of the workpiece measured by the three-dimensional measurement apparatus.

4. A three-dimensional measurement method comprising:
   a first image acquiring step for capturing an image of a workpiece with a first camera to acquire a first image;
   a three-dimensional coordinate calculating step for calculating three-dimensional coordinates of the workpiece from both (a) the first image and (b) preset virtual workpiece depth information;
   a projection calculating step for calculating a projection image of the three-dimensional coordinates to a second camera from a posture parameter of the second camera relative to the first camera and the three-dimensional coordinates of the workpiece;
   a cropping range setting step for setting a cropping range of a second image to be cropped from an image of the second camera based on the projection image calculated in the projection calculating step;
   a second image acquiring step for acquiring the second image by capturing an image of the workplace with the second camera in the set cropping range set in the cropping range setting step; and
   a three-dimensional measurement step for making a three-dimensional measurement of the workpiece from the first image and the second image.

5. A non-transitory computer-readable recording medium on which the three-dimensional measurement program for causing a computer to execute each step according to claim 4 is recorded.

* * * * *